March 24, 1953     J. F. BRYER ET AL     2,632,209
TREATMENT OF PLASTER MOLDS
Filed Aug. 2, 1949
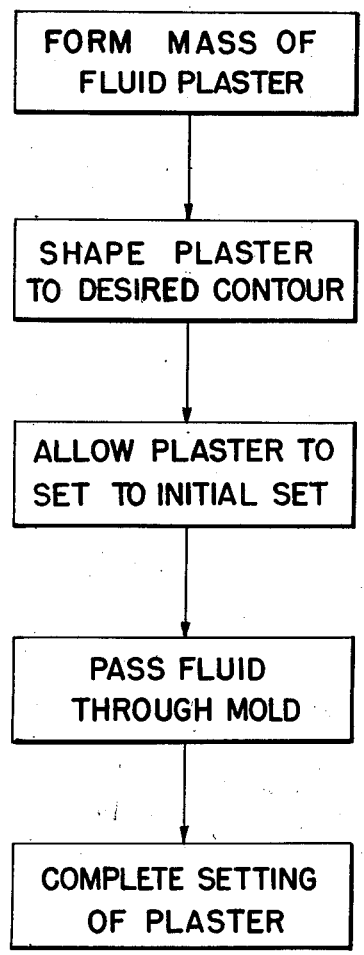
INVENTORS
RICHARD E. STEELE
JOHN F. BRYER
BY
ATTORNEYS Patented Mar. 24, 1953

2,632,209

UNITED STATES PATENT OFFICE 2,632,209

TREATMENT OF PLASTER MOLDS

John Francis Bryer, Wellsville, Ohio, and Richard E. Steele, New Castle, Pa.

Application August 2, 1949, Serial No. 108,228

13 Claims. (Cl. 18—47.5)

The present invention relates to the treatment of plasters used in the manufacture of molds employed in the ceramics industry, and has particular reference to the treatment of plaster molds to render the molds permeable, whereby fluid pressures may be impressed across the faces of the molds for the removal of ware bodies formed on the mold face.

The water absorptive properties of plasters used in mold manufacture have always been known. This property of plasters is referred to as porosity, and is employed as a means of assisting in the removal of shrinkage water from clay bodies to accelerate the compacting and drying of the clay. The capacity of plaster mold bodies to absorb moisture is limited by the rate of removal of water from the pores of the molds. Attempts to accelerate the rate of moisture discharge have been directed primarily along lines of increasing the rate of evaporation, as for example, by the use of heat.

The lack of a stable and permanent permeability in plaster molds, particularly in the more dense molds prepared from specially formulated gypsum cements containing additives to assist in densifying the gypsum, has long been known in the art. This has been considered an inevitable result of the more advanced techniques in mold formation, it being recognized that mold life is extended appreciably if a minimum of water is used in the plaster mix, achieving a maximum apparent density in the mold body. In forming the plaster, it is necessary to use water in excess of that required to react chemically with the calcined gypsum ($CaSO_4 \cdot \frac{1}{2}H_2O$) in order to attain sufficient fluidity in the mix to permit of pouring. This excess water determines to a great extent the porosity of the mold in terms of void volume. The compressive strength of the mold, as well as the resistance to abrasion and shock, is known to decrease in proportion to the increase of the void characteristic, reducing the overall resistance of the mold to surface wear and chipping.

With the advent of the fluid pressure release concept of separation of ware from molds in ware pressure forming operations, the necessity of attaining the characteristic of a stable permeability in plaster molds, without sacrifice of the wear properties of the molds, became evident. Early experiments confirmed the lack of a workable permeability characteristic in plaster molds, especially after the molds had set or cured for an appreciable length of time after formation. While molds constructed with a minimum apparent density achieved a small degree of temporary permeability, this varied throughout the mold body, and these molds became so impermeable upon standing for any length of time, that the application of fluid pressures to the mold internally thereof resulted in destruction of the mold. As the amount of water used in forming the plaster was increased, the surface hardness properties of the molds were sacrificed to a degree rendering use of the molds economically unsound. Accordingly, plaster molds were not acceptable for use in ware pressure forming operations. In all cases where fluid pressures were employed in connection with the molds, substitutes for plaster such as porous metal bodies, Carborundum and the like were employed, with resulting sacrifice in the surface qualities and density of the ware. Also, the porous metal molds were characterized by large and irregular pore formations which rapidly became clogged with minute clay particles, in use.

The present invention has for an object a method of forming plaster molds for use in the ceramic industry, which are characterized by permeability in a degree permitting the passage of fluids such as air from internally of the mold body across the ware forming face of the mold, without sacrifice of the desired ware forming properties of the mold in terms of resistance to erosion and abrasion of the working face of the mold.

A further object is to provide a permeable plaster mold characterized by both an extreme hardness of the mold face, and permanence of the property of permeability of the mold.

A further object is to provide a method of forming plaster molds having an appreciably extended mold life, over conventionally formed plaster molds, and which are relatively free from internal stress lines normally set up by thermal expansion incident to conventional mold formation.

A further object is to provide a method of forming molds permitting the injection of fluid pressures into the mold bodies to effect separation of pressed ware from the mold forming surfaces, eliminating the need for specialized fluid pressure equipment incorporated in the mold body to achieve the fluid pressure separation.

A further object is to provide a method for increasing the permeability of plaster mold bodies whereby the water absorption properties or porosity of the mold bodies is enhanced, without sacrificing the desired ware pressing characteristics of the mold, and whereby the water absorbed in the porous mold during a ware pressing operation may be evacuated from the mold immediately subsequent to release of the ware.

A further object is to provide a method of treating a plaster mold body having the property of permeability, to stabilize the permeability of the mold, preventing clogging of the pores by foreign substances and the building up of crystal deposits in the mold, during use.

Other objects and advantages of the invention will be apparent from the following detailed description thereof, it being understood that the specific embodiments of the invention disclosed are given by way of example only.

The single figure of the drawings is a schematic flow sheet illustrating the process of this invention.

Plaster used in the manufacture of ceramic molds is manufactured from gypsum which occurs naturally in the form of $CaSO_4.2H_2O$. The mineral gypsum is prepared by calcining to remove a part of its chemically combined water, the resulting plaster having the formula $$2CaSO_4.H_2O$$

referred to as the hemihydrate. The calcined gypsum has the property of hardening upon being mixed with water, forming gypsum crystals which densify as a hard mass. The hardness properties of the plaster mold may vary in accordance with the amount of water used in mixing the plaster, the amounts of gypsum in any given section or surface of the mold decreasing as the amount of water employed in forming the plastic mix is increased. The amount of water employed is also known to affect the structure of the mold casting, causing weaknesses to appear in the pressing surface of the mold during use as well as a characteristic deterioration of the mold if allowed to remain in contact with water. These variations in structure ordinarily appear as a tendency of the plaster to soften over a period of extended use, as well as a tendency to crumble and chip under pressures and particularly in the presence of raised temperatures.

In conventional practice, plasters are first mixed with water, for example, preferably in amounts obtaining a dry density of 73.5 pounds per cubic foot. A convenient mix ratio is 60 pounds of water to 100 pounds of plaster. The mixture preferably is prepared with agitation, the fluid mass slowly changing to a jelly-like consistency or "drawing," and then hardening into the final set. The creaming step is important to free occluded air from the mass to eliminate bubbles or pinholes which are a major cause of mold breakdown. As the plaster hardens or sets, the gypsum crystals formed increase in volume, obtaining a considerable expansion of the plaster during setting. This crystal building or growth must be controlled to attain the desired fineness of crystal formation, which is necessary in preserving the density and strength of the mold body.

The setting phase includes a so-called "initial set," where the creamy texture of the mix first stiffens. As agitation is stopped, the mass abruptly passes to the initial set phase. The "final set" occurs as the maximum heat of reaction occurs, whereupon the plaster is safe for handling.

The set of the plaster may be controlled by the addition of accelerators and/or retarding compounds to the gypsum prior to mixing. These materials assist in the control of the porosity and apparent density of the mold. Due to the characteristic of gypsum crystals to grow in the presence of water under certain conditions of set, the presence of accelerators and/or retarders will modify appreciably the final hardness characteristic of the mold. These accelerators and retarders are added for this specific purpose, being all well known in the art, and are pertinent to the present invention only insofar as they have a marked effect on the property of permeability of the plaster mold. The dense gypsum cements and plasters formed employing these materials are substantially completely lacking in the property of permeability.

After the plaster has finally set, a part of the original water used in mixing the plaster is retained in the mold, and is referred to as "free" or "held" water. It is recognized that the presence of this free water reduces the porosity or moisture absorptive property of the mold, and causes gradual deterioration of the strength of the plaster. This free water conventionally is removed by allowing the mold to dry out at regular intervals, and in some cases with the use of artificial heat. The use of artificial heat frequently causes recalcining of portions of the mold surfaces, and is not recommended. The "dry set" method of drying molds involves considerable periods of non-use of the molds, requiring the provision of hundreds of identical molds for a particular molding operation.

The use of deflocculents in clays employed in ceramic molding processes is a source of marked deterioration of the molds due to chemical reaction of the deflocculents with the calcium sulfate content of the plaster mold. Further, the surface of the mold deteriorates as a result of the deposition of calcium carbonate and silicate on the forming face. As the plaster molds are impermeable, it is very difficult to remove these compounds from the mold surfaces without destroying the mold.

These known factors confirm the lack of permeability of the denser type plaster molds, as well as the difficulties of maintaining plaster mold structures which are so porous as to attain any degree of permeability.

By means of the present invention, it is possible to manufacture a plaster mold characterized by the density necessary to prolong the life of the mold in use, as well as the property of permeability such as will permit of the use of fluid pressures emanating from internally of the mold, to remove ware from the mold face.

In accordance with the present invention, it has been discovered that by treating the plaster during the period beginning at the initial set and not later than the period of final set, the property of permeability may be imparted to the plaster body which permits of the use of fluid pressure in connection with plaster bodies, for example, to effect the release of ware from the forming surfaces of plaster molds subsequent to ware pressure forming operations.

In its broadest application, the invention comprehends the application of fluid pressures to the plaster mold body immediately subsequent to the initial setting of the plaster, and before the final set occurs, whereby the contents of the plaster playing no part in the plaster body forming action, are removed. By removing the held water, the fluids necessary to support crystal growth within the mold body are eliminated, thereby affording a fine degree of control over the extent of crystallization occurring within the mass. This purging step is accomplished without loss of apparent density of the plaster body and without sacrifice of the properties of surface hardness so important from the standpoint of mold resistance to abrasion and wear in use. The essential hard, dense crystal structure of the plaster body is undisturbed by this treatment, the purging effecting the removal only of residual components which slowly generate soft crystal growths as the initial set goes to completion.

The setting period for conventional plaster will vary under certain conditions, as much as from thirty to forty minutes. The presence of accelerators or retarders will correspondingly modify the period of set, as well as the temperature of the water employed, and other factors.

The reaction of the hemihydrate form of calcium sulphate with water is an exothermic reaction. Depending upon the condition of set, there may be a change in temperature of approximately 40° F. more or less. With the plaster-water ratio of 100 parts of plaster to 60 parts of water, the period of maximum temperature will occur approximately between 25 and 35 minutes after mixing has been initiated, or 10 to 20 minutes after mixing is stopped. The molds at this period will reach temperatures upward to 130° F. For purposes of convenience, this period has been referred to as the period of "final set," wherein the plaster has reached the desired state of hardness necessary for safe handling.

The purging of the plaster body during the setting stage preferably is accomplished by passing a stream of air under pressure through the plaster body. For best results, it is preferred to use dry air, which accelerates the fixation of the internal crystal structure of the mold. As the mold will be warm during the purging process, it may be desirable to heat the purge air to a temperature approximating 90° F., in order to avoid undue chilling of the mold. The purging step may be accomplished in accordance with the method and apparatus disclosed in application Serial No. 734,174 filed March 12, 1947, entitled "Mold and Method for Molding Ceramic Ware," now Patent No. 2,584,109, and application Serial No. 737,544 filed March 27, 1947, and entitled "Mold for Pottery Ware," now Patent No. 2,584,110, wherein a tubular member is embedded in the plaster body while the plaster is in the unset stage. The plaster body is shaped to the desired contour by any of the conventional procedures. Fluid pressure, such as air pressure, may be impressed upon the plaster body internally thereof, driving held water and water soluble components of the plaster mass from the mold body. The purging step may also be accomplished in other ways, as for example by passing fluid pressure through the entire plaster mold body from rear to front.

In order to impart the proper permeability to the plaster body, it is essential that the purging step be accomplished at the earliest possible moment of setting of the plaster. The plaster must have set sufficiently to resist deformation under the fluid pressures. This time factor may be determined by initially applying a moderate fluid pressure of .25 p. s. i. more or less to the plaster body and then gradually increasing the fluid pressure as the plaster body passes to the final set phase, whereupon a maximum fluid pressure of 75 p. s. i. more or less may be applied to cleanse the internal structure of the mold thoroughly. In practice, pressures varying from 10 to 150 pounds per square inch may be employed without fear of damaging the plaster body. The above procedure has the advantage of retarding further crystal growth at the earliest stage of formation of the mold, whereby a maximum permeability is accomplished. If desired, however, the purging process can be accelerated by waiting for a period of six to eight minutes after the initial set stage, and then applying pressure, which may be raised to 150 p. s. i. safely in a period of from one to ten minutes.

The exact explanation for the accomplishment of the property of permeability in plaster bodies employing the method of the invention is not understood. It is believed, however, that in the initial phase of set, as the creamy plaster mix starts to stiffen, the calcium sulfate crystals form rapidly to set up the rigid plaster body with excess water above the amount required to react with the calcined gypsum held in voids between the formed crystals. The held water contains dissolved materials in minute amounts which as the mold is allowed to stand, gradually pass out of solution as deposits filling in the voids between the calcium sulfate crystals to form an impermeable body. Moreover, the held water apparently facilitates growth of calcium sulfate crystals other than those formed at the period of initial set, which block off the microscopic pores of the plaster.

By removing the held water from the plaster body at the earliest possible moment in the hardening phase of the plaster, it is believed that the crystal growth phase and compound deposit phase of the mold formation is abruptly terminated, retaining and stabilizing all passages within the mold structure, permitting of the passage of fluid through the mold body under pressure.

Where various additives have been incorporated in the plaster for the purpose of modifying the density and hardness properties, the period of set, and other common objectives with regard to mold properties, purging of the plaster body effectively removes these added compounds from the internal structure of the mold after they have fulfilled their original function in the control of the density and rate of hardening of the plaster. Thus, there is no sacrifice or loss of mold hardness, in order to achieve permeability.

In operation, it has been found that delay of the purging step as much as five to ten minutes after the final set of the plaster has occurred, results in an impairment of the permeability of the mold to the point where the passage of fluid such as air through the mold body is prevented, or reduced to a point of ineffectiveness from the standpoint of release of the ware from the face of the mold, with fluid pressure.

Purging of the mold prevents any deterioration of the mold structure incident to the continued presence of moisture in the mold, for example, the characteristic softening of wet molds when allowed to stand over a period of time.

The presence of the deflocculents or other chemically active compounds in the clay used in connection with the molds is rendered of little or no importance, it being possible to flush these materials from the mold with fluid pressure subsequent to each forming operation.

Once the property of permeability has been imparted to a mold, in order to preserve this property over the active life of the mold, it is important to maintain the mold free of moisture by thoroughly purging after each period of use. In this way, small amounts of calcium sulfate and other chemicals which are dissolved in the water incident to a clay pressing operation, are removed from the mold before secondary crystallization can set in, which of course would block off the pores of the mold. Also, the deposition of solids dissolved in the water, such as occurs with evaporation of held water, is prevented.

This thorough purging of the mold body after each pressing operation or series of operations, maintains the initial permeability imparted to the plaster structure and minimizes deterioration of the pressing surfaces of the mold through solution of gypsum in the water of plasticity of the clay. Thus, the initial hardness characteristic of the mold forming phase is maintained throughout the life of the mold, and appreciably extends the life of the mold in terms of ware forming operations.

The invention is applicable to all types of plaster mold bodies. Any mix may be employed in accordance with the final porosity, hardness and density characteristics desired in the mold. The method of the invention achieves permeability in all plaster molds regardless of the particular composition employed, with specific reference to the water-plaster ratio. The invention is not to be limited to a particular method of flushing the mold, it being necessary only that a stream of fluid pressure be passed through the mold, preferably at the point of initial set, and prior to the final set phase. While it is preferred to employ warm, dry air in flushing the mold, it will be apparent that other fluids will be equally effective under conditions attendant the use of a particular type of mold.

The invention may be employed in connection with soft plasters having a low density, manufactured, for example, with an excessive amount of water, and in the absence of plaster densifying compounds. These plasters are characterized by porosity, no permeability, or a limited and irregular permeability which rapidly disappears in use, and softness of the pressing surfaces. By means of the invention, the porosity characteristic of the soft plaster is maintained, the permeability characteristic is enhanced to achieve a stable, permanent permeability throughout the entire body of the mold, and a marked stabilizing of the mold pressing surfaces against the accumulation of hard, non-porous surface films is accomplished. With the more dense plaster molds, the invention imparts a stable and permanent permeability to these molds which heretofore have been completely impermeable, or impermeable to an extent preventing the passage of fluid pressures therethrough. The purging of both types of molds during use markedly increases the useful life of the molds and prevents the structural deterioration which is characteristic of the molds when allowed to set with held water in the pores, or allowed to remain in contact with moisture, as for example on the pressing surfaces.

We claim:

1. A method of treating plaster bodies prepared by mixing calcined gypsum and water and allowing the mixture to set, comprising passing fluid through the plaster after initial set and prior to final setting of the plaster at a pressure of less than one pound per square inch, and gradually increasing the fluid pressure to a maximum of above seventy-five pounds per square inch at the moment of greatest heat of reaction of the calcined gypsum and water.

2. In the method of claim 1, the fluid comprising dry air at a temperature of approximately 90° F.

3. In a method of manufacturing permeable plaster molds in which a fluid mixture of plaster sets to a hard mass of the desired shape, the improvement comprising passing air through the plaster mass subsequent to the initial set of the plaster and prior to the final setting thereof.

4. A method of forming a hard permeable plaster body comprising forming a fluid plaster mass, allowing the fluid plaster to set to a hard body, and purging the plaster body of held water and water soluble components after the initial setting of the plaster and prior to final setting thereof.

5. A method of forming a hard, permeable plaster body comprising forming a fluid plaster mass, allowing the fluid plaster to set to a hard body of the desired shape, and passing a fluid through the plaster body after initial setting and prior to final setting thereof.

6. A method of forming a hard, permeable plaster body comprising forming a fluid plaster mass, allowing the fluid plaster to set to a hard body of the desired shape, and passing air through the plaster body after initial setting and prior to final setting thereof.

7. A method of forming a permeable plaster body comprising forming a fluid plaster mass, allowing the fluid plaster to set to a hard body, and introducing air into the plaster mass and withdrawing air from the plaster mass after initial setting and prior to final setting of the plaster.

8. A method of forming a hard, permeable plaster body comprising forming a fluid plaster mass, allowing the fluid plaster to set to a hard body, and passing warm, dry air through the plaster body after initial setting and prior to final setting thereof.

9. A method of preparing plaster molds comprising forming a fluid mixture of plaster and water, shaping the plaster to the desired contour, allowing the plaster to set to initial set, passing air under pressure through the plaster mass after initial setting of the plaster and prior to final setting thereof to form a permeable mold.

10. A method of preparing plaster molds comprising forming a fluid mixture of plaster and water, shaping the plaster to the desired contour, allowing the plaster to set to initial set, passing a fluid under pressure through the plaster mass after initial setting of the plaster and prior to final setting thereof to form a permeable mold.

11. A method of forming plaster molds comprising forming a fluid mixture of plaster in water, casting the plaster on a pattern to impart the desired contour to the mold, allowing the plaster to set to initial set, and passing air under pressure through the plaster after initial set and prior to final setting thereof to form a permeable mold.

12. A method of manufacturing permeable molds comprising forming a fluid mixture of plaster and water, evacuating the fluid mixture to remove air therefrom, casting the fluid mixture on a pattern to impart the desired contour to the mold, allowing the plaster to set to initial set, and passing air through at least a portion of the mass of the plaster to the contoured surface thereof subsequent to initial set and prior to final set of the plaster.

13. A method of forming a permeable plaster body comprising forming a fluid mixture of plaster and water, allowing the fluid mixture to set to form a hard mass, introducing air under pressure into the plaster mass after initial set and prior to final setting thereof, gradually increasing the pressure of the air introduced into the plaster mass, and discharging the thus introduced air from the plaster mass.

JOHN FRANCIS BRYER.
RICHARD E. STEELE.

REFERENCES CITED

The following references are of record in the file of this patent:

UNITED STATES PATENTS

| Number    | Name             | Date          |
|-----------|------------------|---------------|
| 1,811,950 | Meacham          | June 30, 1931 |
| 2,112,513 | Abott, Jr., et al.| Mar. 29, 1938|
| 2,116,557 | Billner          | May 10, 1938  |
| 2,434,780 | Wiss et al.      | Jan. 20, 1948 |
| 2,474,721 | Billner          | June 28, 1949 |